United States Patent [19]

Stearns

[11] Patent Number: 4,744,578

[45] Date of Patent: May 17, 1988

[54] USER INCLINABLE PRONE STANDER TYPE WHEELCHAIR

[75] Inventor: Cynde Stearns, Bakersfield, Calif.

[73] Assignee: Luconex, Inc., Foster City, Calif.

[21] Appl. No.: 12,507

[22] Filed: Feb. 9, 1987

[51] Int. Cl.[4] .......................... A61H 3/04; B62M 1/14

[52] U.S. Cl. .................... 280/242 WC; 280/289 WC; 280/47.16; 297/DIG. 4

[58] Field of Search ............... 280/242 WC, 289 WC, 280/47.16; 297/DIG. 4, 464, 353; 5/81 R

[56] References Cited

U.S. PATENT DOCUMENTS

| | | | |
|---|---|---|---|
| 2,285,699 | 6/1942 | Everest et al. | 280/47.16 |
| 4,264,085 | 4/1981 | Volin | 297/DIG. 4 |
| 4,287,619 | 9/1981 | Brewer et al. | 297/DIG. 4 |
| 4,333,681 | 6/1982 | Nelson | 297/DIG. 4 |
| 4,390,076 | 6/1983 | Wier et al. | 280/289 WC |
| 4,620,714 | 11/1986 | Davis | 280/289 WC |
| 4,662,676 | 5/1987 | Havelock | 297/DIG. 4 |

*Primary Examiner*—John J. Love

*Assistant Examiner*—Donn McGiehan

*Attorney, Agent, or Firm*—Frank D. Gilliam

[57] ABSTRACT

A user propelled prone stand up wheelchair for an orthopedically disabled user. The wheelchair includes a body platform which is user adjustable between a user substantially vertical stand-up position to a substantially horizontal user face down position. The tilt position of the user relative to the wheelchair support surface is angularly adjustable by the user.

15 Claims, 2 Drawing Sheets

USER INCLINABLE PRONE STANDER TYPE WHEELCHAIR

BACKGROUND OF THE INVENTION

This invention is directed to wheelchairs and more particularly to stand up wheelchairs for victims of cerebral palsy, spina bifida or the like that are unable to independently stand in a prone position.

U.S. Pat. No. 3,107,105 by inventor R. W. Hesiford teaches a standing support for paraplegics. The device of the invention is user propelled but does not provide mechanism for tilting a prone user.

U.S. Pat. No. 3,629,880 teaches a wheelchair type device for elevating the user between a sitting and standing position. User propulsion means is taught.

U.S. Pat. No. 4,054,319 teaches a wheelchair type device for elevating the user between a sitting and standing position. Self propulsion by electric motor means is taught.

U.S. Pat. No. 4,029,089 by Lawrence K. Mulholland, teaches a tiltable prone stand up type wheelchair. The prone user of the device can be tilted relative to the wheelchair supporting surface; However, the tilting cannot be accomplished by the user and must be accomplished by another person or persons. There is no teaching that the device can be tilt positioned at an infinite number of locations through it's tilt range. Additionally, there is no teaching that the user can mount or dismount the device without the help of another person or persons. The device cannot be propelled by the user. The brakes cannot be set or released by the user.

The limitations of these and other prior art prone stand up type wheelchairs have not been successfully overcome until the emergence of the instant invention.

SUMMARY OF THE INVENTION

The wheelchair of the invention allows the orthopedically handicapped user to mount and dismount without help. The user can crawl onto the device in a horizontal face down position, strap him or herself to the device, elevate the device from a horizontal position to a chosen vertical tilt position and then propel themselves.

The wheelchair of this invention includes a non-tippable base having two longitudinally triangular shaped longitudinal sides each with caster wheels on each end thereof. A first cross member is positioned between the two longitudinal sides toward the rear of the base at an elevation intermediate the caster wheel connection and the apex of the triangle forming the longitudinal sides. The first cross member serves two functions, namely it rigidly supports the relative position of the two frame members and provides an axle for attachment of the user tilt platform. The user tilt platform includes a foot rest or platform at the lower end thereof and a forward user body support member extending upwardly from the foot rest. The body support member is height adjustable to accommodate users of different heights. Bearings on the outer edges of the body support member intermediate the foot rest and top surface are attached to the first cross-member for rotation thereabout. The upper portion of the body support member includes an extended platform on the front side opposite from the user portion side. The upper end of an actuator, shown in the form of a sample screw jack actuated by a hand crank assembly associated with appropriate gears, is fixedly attached to the central distal edge of the extended platform. The lower opposite end of the screw jack housing is pivotly attached to a second cross member which is positioned forwardly of the first cross-member. The second cross member like the first cross-member provides support to the two frame members and provides an axle for the pivotal rotation of the screw jack housing attachment. The second cross member is attached to a downwardly extending support at an elevation lower than the elevation of the lower surface of the frame members.

The upper apex of each of the triangles forming the frame member includes a bore therethrough for receiving a quick release stub axle for the rotational attachment of a conventional wheelchair wheel. The wheelchair wheels the traction surface of which extend slightly below the level of the caster wheels are used by the user to propel the wheelchair device. The stub axles and wheelchair wheels are easily removable for the transport or storage of the wheelchair device in a car trunk or a like sized space.

A strap attached to the user tilt platform is used to secure the user to the device. A major strap is positioned to secure over the buttocks region of the user. Additional straps to secure the feet or upper torso and knees may be employed as required. These straps may be formed from Velcro strap type material or any other convenient strap material and attachment means.

In use the user tilt platform can be positioned substantially parallel with the wheelchair support surface to allow a physically disabled user to crawl onto or be placed on the user tilt platform, the strap or straps are then secured around the body portions of the user and crank the screw jack from its minimum length position to its maximum length user stand up position or any other tilt position therebetween. With the maximum extension of the screw jack, the user can elevate him or her self from the substantially parallel position to a position substantially vertical relative to the support surface. The user may also be placed in the device with the user tilt platform in the user stand up position initially.

The user can crank or otherwise manipulate the device between extreme screw jack maximum and minimum extensions for any purpose such as, for example, to mount or dismount the device, to retrieve items dropped to the device support surface, etc., without the help of another person.

The extended platform includes an item support tray and a soft item holding compartment on its upper surface. The support tray has different sized apertures for securing therein various sized containers of liquid or the like.

The user tilt platform is telescopic to accommodate and provide tilt support for various different height users or for adjustment to a single growing user. The lower portion of the platform comprises a pair of short upright tubular members, each one is fixedly secured to each side thereof and to the first cross member. The upper portion of the tilt platform is substantially in the form of an inverted "U" shaped tubular member each open side of which is sized to telescope into the short upright tubular members. An aperture is provided in each of the short upright tubular members and a plurality of spaced apart alignable apertures are provided along the sides adjacent to the open ends of the upper portion. The upper portion can be height adjusted by locking with a pin a selected aperture on each side of the upper portion with the aperture in the lower portion in a conventional known manner.

An optional seat platform is provided for attachment to the rear or user side of the tilt platform. The seat platform includes length adjustable upper and lower support leg portions. The lower end of lower support leg portion includes a pivotable extension that is insertable into a short length of tube secured to each of the side frames. The end of the tube and the pivotable extension are secured together by means of an aligned bore in each which is pinned. The upper ends of the lower support leg portion telescope within the lower ends and can be pin locked at various aperatures for the desired overall length in the same manner as the user tilt platform. The upper ends of the lower leg portions are pivotly attached to the rigid upper support leg portions. The upper lower leg support portions may be interconnected by a support bracket for rigidity therebetween. The upper distal ends of the upper support leg portions may take the form of rearwardly extending handles for a caretaker to propel the wheelchair.

A fixed-in-place back rest and a removable seat portion are attached to the upper support leg portion. The seat portion extends across a pair of tubular extensions. The distal ends of each of the tubular extensions are pivotly connected to the tubular extensions and sized for insertion into a short tube attached to each side of the inverted "U" portion of the user tilt platform. The distal ends of the tubular seat extensions and the ends of the lower leg support portion removably lock the seat platform to the user tilt platform.

The removable seat portion can be substituted with a removable potty chair seat portion which includes a central aperture for retaining a pot inserted horizontally thereunder.

An object of the invention is to provide an improved therapeutic device for an orthopedically disabled person.

Another object of the invention is to provide a therapeutic disabled user propelled device which allows the user to selectively tilt his prone body to any position between a substantially vertical standing position to a substantially horizontal face down position adjacent the device support surface.

Another object of the invention is to provide a therapeutic disabled user propelled device that is extremely stable and substantially non-tippable under normal use conditions.

Still another object of the invention is to provide a therapeutic disabled user device which is light in weight and easily disassembled for transporting in the trunk of a small automobile vehicle or stored in a small space.

Still another object of the invention is to provide a therapeutic disabled user wheelchair device which includes a sit down support means as well as a stand up support means.

Yet another object of the invention is to provide a therapeutic disabled user wheelchair device with a sit down seat member that can be conveniently converted to a potty chair.

Yet another object of the invention is to provide a therapeutic disabled user stand up wheelchair device which can be user positioned to function as a crawler.

A still further object of the invention is to provide the user with muscle stretching and joint stimulation by user operation of the device.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

DETAILED DESCRIPTION OF THE DRAWINGS

Figure 1:
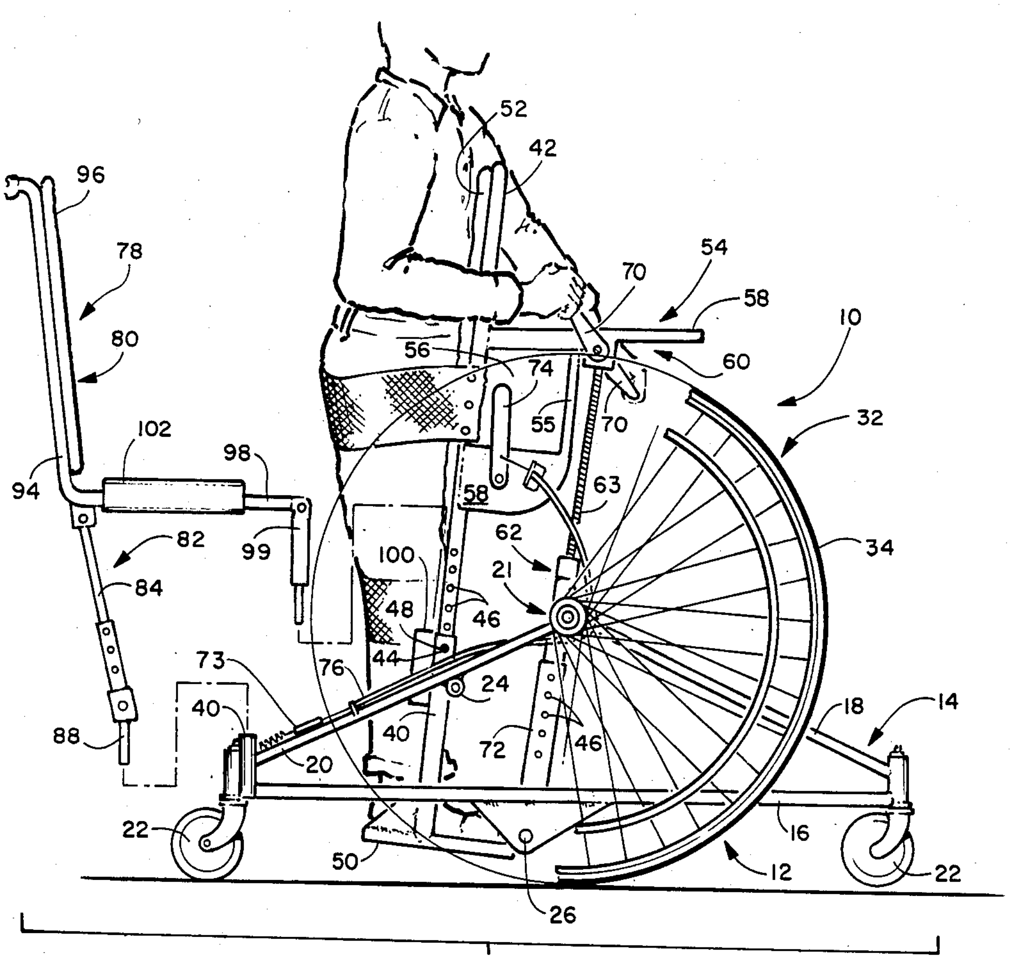
FIG. 1 is a side view showing of the wheelchair device of the invention in a body platform vertical position.
Figure 2:
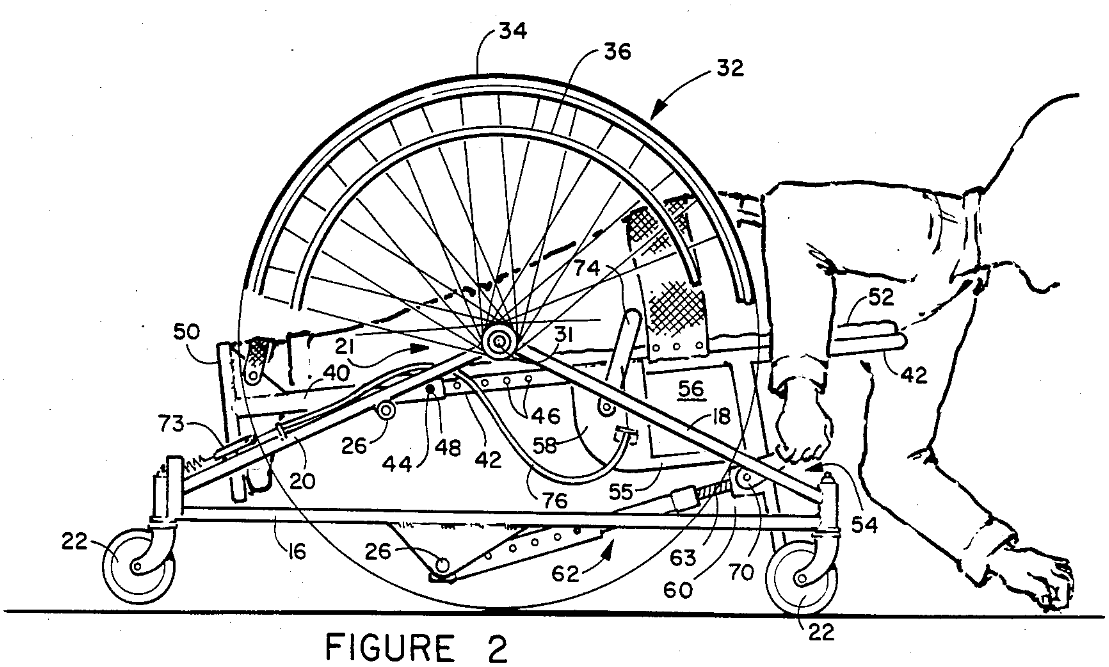
FIG. 2 is a side view showing of the wheelchair device of the invention in a body platform horizontal position.
Figure 3:
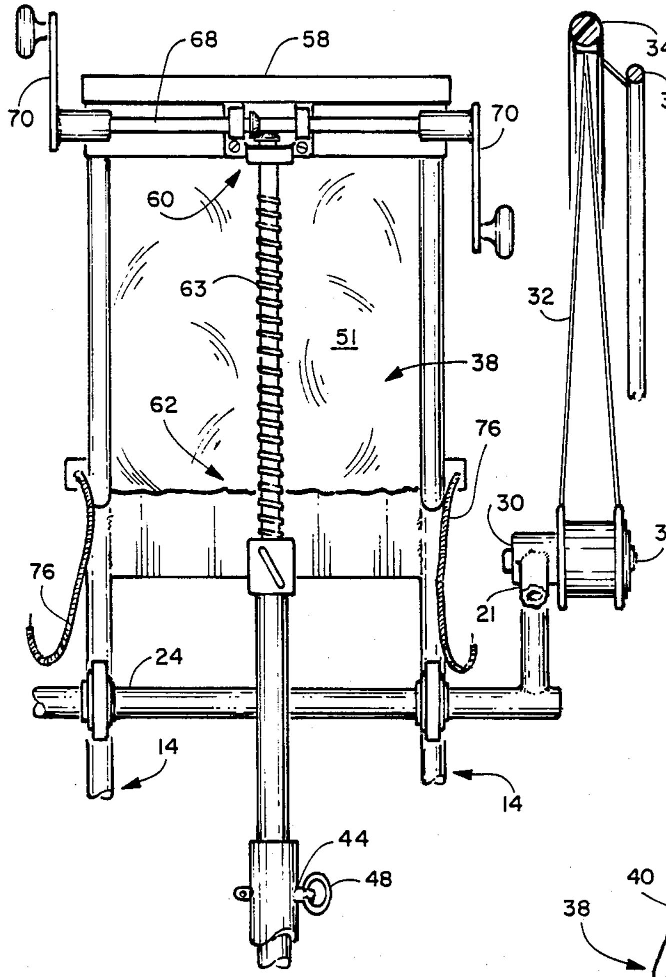
FIG. 3 is a front view of the body platform inclining mechanism.
Figure 5:
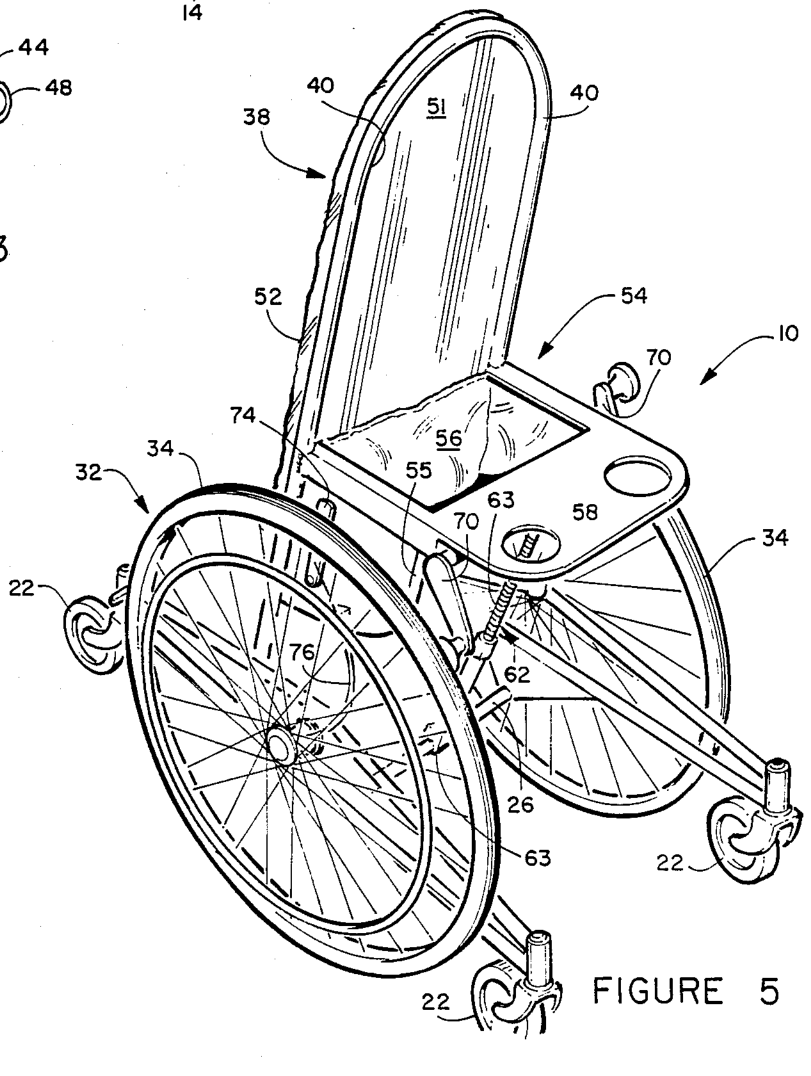
FIG. 5 is an elevated perspective showing of the wheelchair device of the invention.

Referring now to the drawing Figures, FIGS. 1, 3 and 5 depicts the user stand-up wheelchair device 10 of the invention in a user prone standing configuration.

The device 10 has a support or base member 12 formed by two triangular shaped side portions. The side portions include a tubular horizontally positioned bar 16 connected to a pair of bars 18 and 20 one attached to each end of the bar 16 and connected together at the apex 21 of the triangle formed by 16, 18, and 20. Each end of each side portion 14 are joined together by transverse cross-members 24 and 26. Transverse cross-member 24 is connected to bar 18 between the bar 16 and bar 20 below the elevation of bar 16 by a triangular extension therefrom directed toward the support surface 28.

A tubular aperture 30 at the apex 21 is adapted to receive a stub axle 31 with an enlarged head flange of a greater diameter than the aperture 30.

The stub axle 31 commonly in the form of a quick release pin generally known in the wheelchair art has a smooth surface extending from the outer enlarged head flange into an inner axle housing where it is secured by releasable ball retainers. The smooth surface acts as a bushing within the aperture 30 and as a bushing for a conventional wheelchair wheel 32 which is positioned on the stub axle between the outer surface of the aperture 30 and the ball retainers end. The wheelchair wheels can be easily removed from or installed on the wheelchair device 10. The conventional wheelchair wheel 32 includes a tire or traction means 34 and a removable user propulsion ring 36 (see FIG. 3). The traction surfaces of the wheelchair wheels 32 are at a slightly lower horizontal plane than the caster wheels 22. Generally only two of the caster wheels on either the front or back, contact the wheelchair support.

A tiltable body platform 38 is pivotally attached to cross-bar 24 for rotation relative to the side portions 14 between a substantially vertical prone user body position and a substantially horizontal prone user body position. The body platform 38 includes a pair of tubular uprights 40 which are pivotly attached to the cross bar 24. An inverted "U" shaped upright member 42 is insertable into the open ends of the tubular uprights 40 in a telescoping manner. A bore 44 through each upright 40 align with one of a plurality like bores 46 in each upright 42 to establish the height of the body platform relative to the traction surfaces of the wheels.

Upright member 42 is translated relative to tubular uprights 40 and at the selected height a keeper pin 48 is inserted through the aligned bores 44 and 46 in each of the tubular uprights 40 for maintaining that selected height. A platform or foot rest 50 is fixedly attached between the uprights 40 at their lower ends. The open portion of the inverted "U" upright above the bores 46 is enclosed with support material 51 and outer padding 52. Adjacent the closed end of the inverted "U" upright on the front side adjacent the support material 51 is an open transverse support platform 54 supported by angled supports 55. The platform 54 is substantially "C" shaped with the open surface adjacent the support material 51. An item carrying pouch 56 constructed of soft pliable material such as leather, vinyl or the like, is attached to the inner surface of the "C" from the support material 51 and the angle supports 55. A plate 58 is attached and extends from the closed surface of the "C" shaped platform 54. The plate 58 includes at least two different sized apertures for carrying beverage cups or the like.

Centrally attached to the closed surface of the "C" shaped platform 54 beneath the plate 58 is a crank and gear assembly 60 and an actuator 62. The actuator shown is a linear actuator in the form of a screw jack. Other linear and non-linear actuators may be substituted therefore. The threaded screw portion 63 of the screw jack is attached to a horizontal bevel gear which meshes with a vertical bevel gear attached to a shaft 68. Each end of the shaft 68 has an offset crank arm 70. The crank arms 70 are oppositely directed as shown. The lower end of the housing portion 72 of the screw jack 62 in pivotally connected to the center portion of cross bar 26 and pivots thereabout.

As can be understood, the rotation of shaft 68 by the crank arms 70 causes the length of the actuator 62 to vary between maximum and minimum lengths in a conventional and known manner.

Attached to the lower surface of each support 55 is a brake actuation lever 74 for operating a brake shoe 73 against the surface 34 of the wheelchair wheel 32. The actuation of either lever 74 downward causes cable 76 to apply friction braking to the associated wheel 32. The brakes can be applied together to stop or applied on a selected side to aid in turning the wheelchair device 10.

Figure 4:
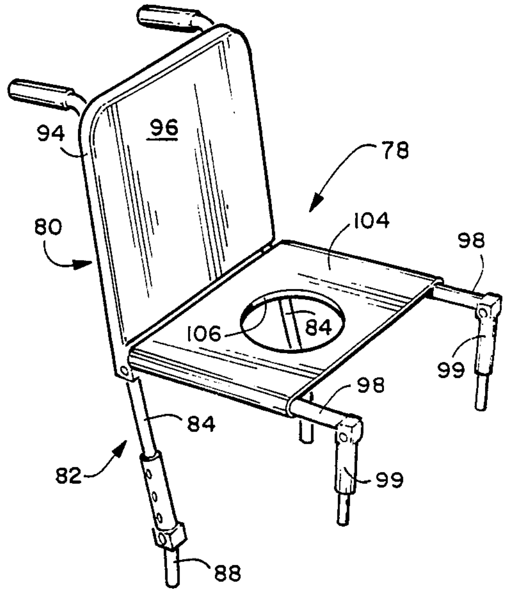
FIG. 4 is a showing of the seat assembly with a potty chair seat attached thereto.

An adjustable height seat attachment 78 is provided (see FIGS. 1 and 4). The seat attachment is formed in two sections, namely, upper section 80 and lower section 82. Lower section 82 is comprised of two telescoping legs 84 which are length adjustable in the same manner as the body platforms 38. The distal ends of each leg 84 includes a pivotable extension 88 which is insertable in a socket bracket 90 one of which are positioned on each side of the member 42 and locked therein by locking pin in the same manner as the other telescopic sections of the invention are locked. The upper ends of legs 84 are pivotly attached to the lower ends of upper arms 94. The distal ends of upper arms 94 may be formed outwardly to provide caretaker handles for propelling the wheelchair device 10 if desired. A fixed in position back surface 96 of soft material is fixedly attached between the upper arms 94. A pair of extensions 98 are attached one to each of the upper arms 94 and extend substantially perpendicular to the arms 94. The distal ends 99 of each of the extensions 98 are pivotally attached to form the required attachment angle with the extensions. A socket bracket 100 attached to each of the tubular uprights 40 receives the distal end 99 of the extensions 98. The extensions 88 and 98 positioned within their respective socket bracket support the seat attachment 78. A removable seat platform 102 snap attaches to the upper surfaces of extension 98. For user convenience, a seat platform 104 having a central aperture 106 adapted to receive a pot thereunder for use as a potty chair can be substituted for seat platform 102.

The inverted "U" shaped upright member 42 and the seat attachment 78 can be independently removed from the device 10.

For storage of the wheelchair type device 10 if the invention in an automobile trunk or similar confined space, the wheelchair wheel and stub axles are removed and the actuator is adjusted to its shortest length.

For use of the wheelchair type device of the invention, the stub axles and wheels are installed, the user either crawls onto the body platform 38 or is placed thereon, strapped thereto in a face down position, and the actuator is then caused to extend a desired length to place the prone user in a chosen vertical tilt position. If the user desires to sit then the height adjustable sear attachment 78 is installed. The seat attachment must be installed and removed when the body platform is in a substantially vertical user standing position.

The gear ratio of the bevel gears are selected so that a person of with only minimal arm strength can crank the actuator through its maximum limits of travel.

The frame structure of the device can be constructed of any suitable light weight tubular material such as, for example and not by way of limitation, plastic, aluminum, steel or the like. The backing support for the body platform can be ply wood, sheet metal or any other suitable light weight material. The caster wheels can be constructed of any suitable material suitable for the purpose intended. The soft pliable material may be cloth, plastic or the like. The means for tilting the body platform may take many other forms such as, but not limited to, pneumatic, hydraulic, electrical or equivalent types linear or non-linear actuating devices.

As many embodiments may be made of this invention concept, and as many modifications may be made in the embodiment herein before shown and described, it is to be understood that all matter herein is to be interpreted merely as illustrative, and not an a limiting sense. Changes in shape, size, and arrangement of detail coming within the field of invention claimed may be resorted to in actual practice, if desired.

What is claimed is:

1. A wheelchair with an inclinable prone user support platform comprising:
   - a pair of juxtaposed longitudinal support frames with a front and back end with a caster wheel on each of the ends thereof, said caster wheels adapted to rest upon a planar supporting surface with the adjacent caster wheels having a longitudinal opening therebetween;
   - first and second spaced apart transverse support members extending between and fixedly attached to each of said pair of support frames remote from said ends;
   - said inclinable prone user support platform comprising a body support member for the support of the forward portion of the prone body of the user and a floor platform for supporting the feet of the user, said body platform is pivotally attached to said first support member for relative rotation between said support frames;

a length adjustable actuator means fixedly connected to said user platform at one end and pivotally attached to said second support member at its other end; and user adjustment means for adjusting the length of said length adjustable actuator means for tilting said user platform between a support member position substantially vertical to said planar supporting surface and a user platform position substantially horizontal and adjacent to said planar supporting surface whereby said user can craw onto said body support member through the longitudinal opening between adjacent casters when said user platform is in said substantially horizontal position and then elevate himself by operating said user adjustment means for positioning said user platform to a substantially vertical position.

2. The invention as defined in claim 1 additionally comprising a stub axle attached to the outer surface of each of said support frames for removable receiving a large diameter wheel for engagement with the planar supporting surface and engageable by the user to propel said wheelchair.

3. The invention as defined in claim 1 wherein said length adjustable actuator means is a linear actuator.

4. The invention as defined in claim 2 wherein the lowermost surface of said large diameter wheels is on a lower horizontal plane than said caster wheels.

5. The invention as defined in claim 2 additionally comprising means for braking the large diameter wheels.

6. The invention as defined in claim 1 additionally comprising strap means for confining said user to said platform.

7. The invention as defined in claim 1 additionally comprising a seat platform removably attachable to said user platform when said user platform is in a substantially vertical position.

8. The invention as defined in claim 7 wherein said seat platform is positionable relative to said user platform.

9. The invention as defined in claim 1 wherein said body support member is length adjustable.

10. The invention as defined in claim 7 further comprising a central opening through said seat platform for use as a potty chair.

11. The invention as defined in claim 1 additionally comprising a tray with a food platform and drink container holding apertures therethrough attached to said body support member adjacent the front body portion of the prone user.

12. The invention as defined in claim 1 wherein said actuator is length adjustable through an infinite number of different lengths between it's fully deployed and fully retracted lengths.

13. The invention as defined in claim 1 wherein said user adjustment means comprises a hand operated crank assembly.

14. A wheelchair with an inclinable prone support platform comprising:

a pair of spaced apart juxtaposed longitudinal support frames with a caster wheel on each end thereof, adjacent caster wheels having a longitudinal space therebetwen and adapted to rest upon a planar supporting surface;

first and second spaced apart transverse support members positioned remote from said spaced apart casters extending between and fixedly attached to each of said pair of support frames;

said inclinable prone user support platform comprising a body support member for the support of the forward portion of the prone body of the user and a floor platform for supporting the feet of the user, said body platform is pivotally attached to said first support member for relative rotation between said support frames;

a length adjustable jackscrew fixedly connected to said user platform at one end and pivotally attached to said second support member at its other end; and user platform tilt adjustment means comprising a horizontally disposed bevel gear, a vertically disposed bevel gear which meshes with said horizontally disposed, bevel gear, a rotatably supported shaft having an offset crank arm on each end thereof, the offset crank arms are oppositely directed for rotation by the user for adjusting the length of said adjustable screw jack for tilting said user platform at any angle of inclination between a support member position substantially vertical to said planar supporting surface and a user platform position substantially horizontal to said planar supporting surface.

15. The invention as defined in claim 14 additionally comprising large diameter wheels for engagement with said supporting planar surface and engagable by the user to propel the wheelchair, the lower surface of said large diameter wheels are on a lower plane than said caster wheels.

* * * * *